(12) United States Patent
Tanaka et al.

(10) Patent No.: US 9,027,724 B2
(45) Date of Patent: May 12, 2015

(54) STARTING DEVICE

(75) Inventors: Junji Tanaka, Anjo (JP); Yuito Abe, Okazaki (JP); Kazuyoshi Ito, Tsushima (JP); Koji Maeda, Anjo (JP); Naohisa Momiyama, Hekinan (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/983,469

(22) PCT Filed: Feb. 29, 2012

(86) PCT No.: PCT/JP2012/055139
§ 371 (c)(1),
(2), (4) Date: Sep. 30, 2013

(87) PCT Pub. No.: WO2012/132740
PCT Pub. Date: Oct. 4, 2012

(65) Prior Publication Data
US 2014/0027231 A1   Jan. 30, 2014

(30) Foreign Application Priority Data

Mar. 31, 2011 (JP) .................................. 2011-080208

(51) Int. Cl.
*F16H 45/02* (2006.01)
*F16D 33/18* (2006.01)
*F16D 25/0638* (2006.01)
*F16D 13/38* (2006.01)
(Continued)

(52) U.S. Cl.
CPC ................ *F16D 33/18* (2013.01); *F16H 45/02* (2013.01); *F16D 25/0638* (2013.01); *F16D 13/38* (2013.01); *F16D 13/74* (2013.01); *F16D 25/123* (2013.01)

(58) Field of Classification Search
USPC ................ 192/3.3, 3.29, 85.24, 85.61, 70.12
See application file for complete search history.

(56) References Cited

U.S. PATENT DOCUMENTS

| 7,017,724 | B2* | 3/2006 | Hayabuchi et al. | ........ 192/70.17 |
| 7,114,604 | B2* | 10/2006 | Masuya | ........ 192/3.29 |
| 7,794,358 | B2 | 9/2010 | Parks et al. | |

(Continued)

FOREIGN PATENT DOCUMENTS

DE   10 2008 060 940 A1   6/2010
JP   A-2001-116110   4/2001

(Continued)

OTHER PUBLICATIONS

International Search Report issued in International Application No. PCT/JP2012/055139 dated May 22, 2012 (with translation).

*Primary Examiner* — Ramya Burgess
*Assistant Examiner* — Lillian Nguyen
(74) *Attorney, Agent, or Firm* — Oliff PLC

(57) ABSTRACT

A lockup clutch mechanism of a hydraulic transmission device includes a lockup piston that is capable of moving toward a front cover to press first and second friction plates, and a flange member that together with the lockup piston defines an engagement-side oil chamber. The front cover and the lockup piston define a first lubricant passage that supplies hydraulic oil to the first and second friction plates. A second lubricant passage communicating with the first lubricant passage is formed in a centerpiece of the front cover. A first shaft oil passage communicating with the engagement-side oil chamber and a second shaft oil passage communicating with the second lubricant passage are formed in an input shaft.

11 Claims, 3 Drawing Sheets

(51) Int. Cl.
*F16D 13/74* (2006.01)
*F16D 25/12* (2006.01)

(56) References Cited

U.S. PATENT DOCUMENTS

| | | | | |
|---|---|---|---|---|
| 2005/0133328 A1* | 6/2005 | Masuya | ......................... | 192/3.3 |
| 2008/0264750 A1* | 10/2008 | Sakai | ......................... | 192/70.12 |
| 2009/0242348 A1* | 10/2009 | Ishikawa et al. | ........... | 192/55.61 |
| 2010/0105519 A1 | 4/2010 | Kasuya et al. | | |
| 2010/0126816 A1* | 5/2010 | Takei et al. | .................. | 192/3.29 |
| 2011/0000757 A1* | 1/2011 | Muizelaar et al. | ......... | 192/70.12 |
| 2011/0132709 A1 | 6/2011 | Fukunaga et al. | | |
| 2011/0132710 A1* | 6/2011 | Schenck | ...................... | 192/3.33 |
| 2013/0306426 A1* | 11/2013 | Tanaka et al. | ................ | 192/66.3 |

FOREIGN PATENT DOCUMENTS

| | | |
|---|---|---|
| JP | 2007-333212 A | 12/2007 |
| JP | 2008-075861 A | 4/2008 |
| JP | A-2008-163982 | 7/2008 |
| JP | A-2009-243597 | 10/2009 |
| JP | A-2010-105450 | 5/2010 |
| JP | 2011-038642 A | 2/2011 |

* cited by examiner

STARTING DEVICE

INCORPORATION BY REFERENCE

The disclosure of Japanese Patent Application No. 2011-080208 filed on Mar. 31, 2011 including the specification, drawings and abstract is incorporated herein by reference in its entirety.

BACKGROUND OF THE INVENTION

The present invention relates to starting devices that include a clutch capable of transmitting power input to an input member to an input shaft of a transmission device and capable of cutting off the power transmission between the input member and the input shaft.

DESCRIPTION OF THE RELATED ART

Conventionally, as wet multi-plate clutch devices that are placed between a transmission device and an engine to transmit power therebetween, such clutch devices are known that include: a clutch drum supporting a plurality of friction plates (friction plates); a hub member supporting a plurality of friction plates (separator plates); a piston pressing near the radial centers of the friction plates; and a cover member coupled to the clutch drum so as to cover an opening (see, e.g., Japanese Patent Application Publication No. 2008-163982 (JP 2008-163982 A)). In such clutch devices, a narrow passage is defined by the hub member and the cover member, and lubricant is introduced through this passage into a space around the plurality of friction plates. The lubricant having lubricated the plurality of friction plates is discharged after staying in the clutch drum.

As starting devices including a multi-plate clutch, such starting devices are known that include: a piston capable of rotating together with an input member (front cover) and moving in the axial direction toward the input member to press a plurality of friction plates; and an annular oil-chamber defining member placed behind the piston, and together with the piston, defining an engagement-side oil chamber to which hydraulic oil is supplied (see, e.g., German Patent Application Publication No. 102008060940 (DE 102008060940 A)). In such starting devices, hydraulic oil is supplied to the engagement-side oil chamber defined between the piston and the oil-chamber defining member through an oil passage formed in an input shaft of a transmission device, and hydraulic oil as a lubricating/cooling medium is supplied to the plurality of friction plates through an oil passage formed on the outer periphery of the input shaft and an oil passage defined between the input member and the piston.

SUMMARY OF THE INVENTION

In the conventional clutch devices, however, the lubricant heated by the heat of the plurality of friction plates stays around the friction plates, and thus may not be able to efficiently cool the plurality of friction plates. In the conventional starting devices, an oil passage that supplies hydraulic oil as a lubricating/cooling medium to a plurality of bearings etc. branches off from the oil passage formed on the outer periphery of the input shaft. This may cause leakage of the hydraulic oil at the branched portion, whereby a sufficient amount of hydraulic oil may not be able to be supplied to the plurality of friction plates of the clutch.

It is a primary object of the present invention to allow a plurality of friction plates of a multi-plate clutch to be efficiently cooled in a starting device including the multi-plate clutch.

A starting device of the present invention employs the following means in order to achieve the primary object.

According to an aspect of the present invention, a starting device includes: a clutch capable of transmitting power input to an input member to an input shaft of a transmission device and capable of cutting off the power transmission between the input member and the input shaft. In the starting device, the clutch includes a first friction plate that is rotatable together with the input member, a second friction plate that is rotatable together with the input shaft of the transmission device, a piston that is capable of rotating together with the input member and moving in an axial direction toward the input member to press the first and second friction plates, and an oil-chamber defining member that together with the piston defines an engagement-side oil chamber to which hydraulic oil is supplied, a first lubricant passage that supplies the hydraulic oil to the first and second friction plates is defined between the input member and the piston, a second lubricant passage communicating with the first lubricant passage is formed in the input member, and a first shaft oil passage communicating with the engagement-side oil chamber and a second shaft oil passage communicating with the second lubricant passage are formed in the input shaft.

This starting device includes the piston that is capable of rotating together with the input member and moving in the axial direction toward the input member to press the first and second friction plates, and the oil-chamber defining member that together with the piston defines the engagement-side oil chamber to which the hydraulic oil is supplied. The first lubricant passage that supplies the hydraulic oil to the first and second friction plates is defined between the input member and the piston, the second lubricant passage communicating with the first lubricant passage is formed in the input member, and the first shaft oil passage communicating with the engagement-side oil chamber and the second shaft oil passage communicating with the second lubricant passage are formed in the input shaft. Thus, in the starting device, the hydraulic oil is supplied from the second shaft oil passage in the input shaft to the first and second friction plates of the clutch through the second lubricant passage in the input member and the first lubricant oil passage between the input member and the piston. In particular, the amount of leakage of the hydraulic oil in the second shaft oil passage can be reduced as much as possible by thus forming the second shaft oil passage in the input shaft, and allowing the second shaft oil passage to communicate with the first lubricant passage through the second lubricant passage formed in the input shaft. The first lubricant passage having a sufficient capacity can be defined on the inner peripheral side of the first and second friction plates by the input member and the piston by forming the clutch so that the clutch is engaged when the piston is moved in the axial direction toward the input member, and defining the engagement-side oil chamber on the opposite side of the piston from the input member by using the oil-chamber defining member. Thus, in the starting device, a sufficient amount of hydraulic oil can be supplied to the first and second friction plates of the clutch, and the first and second friction plates can be efficiently cooled. If a sufficient amount of hydraulic oil is supplied to the first and second friction plates through the second shaft oil passage, the second lubricant passage, the first lubricant passage, etc. when the clutch is disengaged, the first and second friction plates that have been pressed together can be quickly separated from each other. Moreover, since the engagement-side oil chamber is defined on the opposite side of the piston from the input member by using the oil-chamber defining member, a relatively high oil pressure that engages the clutch is not applied to the input member, and bulging of the input member can be suppressed.

A first engagement oil passage communicating with the first shaft oil passage may be defined between one end of the input shaft and an inner end surface of the input member which faces the one end of the input shaft, and a second engagement oil passage communicating with the first engagement oil passage and the engagement-side oil passage may be formed in the input member. In this case, the hydraulic oil is supplied from the first shaft oil passage in the input shaft to the engagement-side oil chamber between the piston and the oil-chamber defining member through the first engagement oil passage and the second engagement oil passage. Accordingly, the amount of leakage of the hydraulic oil in the first shaft oil passage, the first engagement oil passage, and the second engagement oil passage can be reduced as much as possible by merely placing between the input shaft and the input member one seal member that suppresses leakage of the hydraulic oil from the first engagement oil passage.

The starting device may further include: an output member that can be coupled to the input member via the clutch, and that is rotatably fitted in the input member and is rotatable together with the input shaft, the input shaft, the input member, and the output member may define a third lubricant passage communicating with the second shaft oil passage and the second lubricant passage, and a seal member may be placed between the input member and the input shaft and a seal member may be placed between the input member and the output member in order to suppress leakage of the hydraulic oil from the third lubricant passage. The seal member between the input member and the input shaft can suppress leakage of the hydraulic oil from the first engagement oil passage and communication between the first engagement oil passage and the third lubricant passage, and the seal member between the input member and the output member can suppress leakage of the hydraulic oil from the third lubricant passage. Thus, the number of seal members in the starting device can be reduced.

The hydraulic oil may be supplied to the second shaft oil passage through an oil passage that is defined by the input shaft, a stator shaft placed around an outer periphery of the input shaft, and a bush placed between the input shaft and the stator shaft to suppress leakage of the hydraulic oil, and the input shaft and the output member may form a fit seal portion that suppresses leakage of the hydraulic oil from the third lubricant passage. Thus, the hydraulic oil can be more reliably supplied from between the input shaft and the stator shaft to the second shaft oil passage.

Moreover, the input member may have a protruding portion that is formed so as to protrude in the axial direction toward the piston, and that contacts one of the first and second friction plates. Thus forming in the input member the protruding portion contacting one of the first and second friction plates can reduce the number of parts and can further increase rigidity of the input member.

The oil chamber defining member may be fitted in the input member and may be fixed to the input member in the axial direction. This can reduce the number of seal members that are used to seal the engagement-side oil chamber.

The starting device may further include: a pump impeller; and a turbine runner, the input member may be a front cover that is bonded to a pump shell of the pump impeller, and that together with the pump shell forms a hydraulic transmission chamber, and the hydraulic oil may be supplied to the hydraulic transmission chamber through the first lubricant passage. Thus, when power is transmitted by the pump impeller and the turbine runner, a sufficient amount of hydraulic oil can be supplied to the pump impeller and the turbine runner through the first lubricant passage. When the clutch is engaged (when a lockup operation is performed), a sufficient amount of hydraulic oil can be supplied to the first and second friction plates through the first lubricant passage, and the first and second friction plates can be efficiently cooled.

DETAILED DESCRIPTION OF THE EMBODIMENTS

A mode for carrying out the present invention will be described below by using an embodiment.

Figure 1:
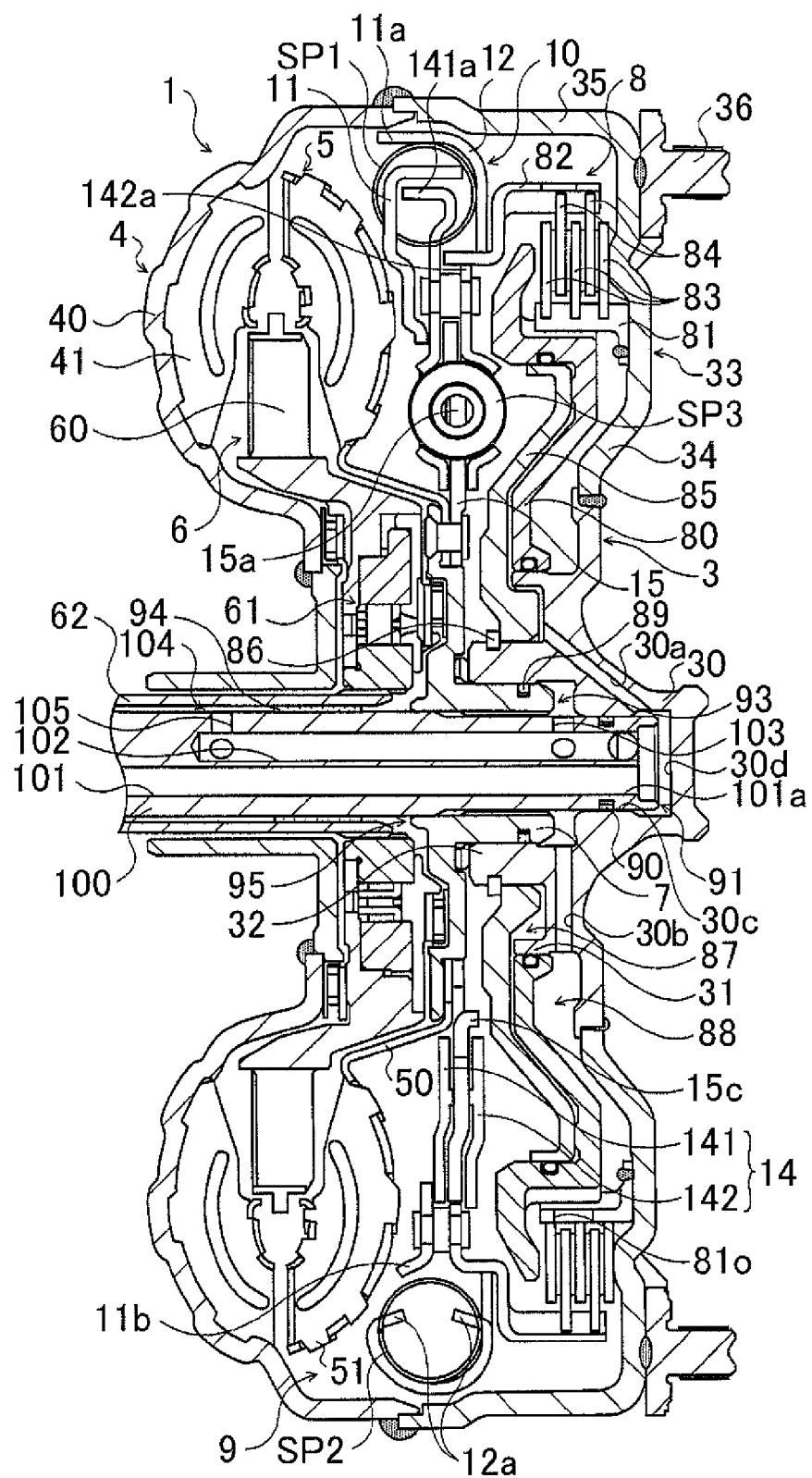
FIG. 1 is a partial sectional view showing a hydraulic transmission device 1 as a starting device according to an embodiment of the present invention.

FIG. 1 is a configuration diagram showing a hydraulic transmission device 1 as a starting device according to an embodiment of the present invention. The hydraulic transmission device 1 shown in the figure is a torque converter that is mounted as a starting device on a vehicle including an engine (internal combustion engine) as a motor, and includes: a front cover (input member) 3 that is coupled to a crankshaft of the engine, not shown; a pump impeller (input-side hydraulic transmission element) 4 fixed to the front cover 3; a turbine runner (output-side hydraulic transmission element) 5 capable of rotating coaxially with the pump impeller 4; a stator 6 that adjusts the flow of hydraulic oil (working fluid) from the turbine runner 5 to the pump impeller 4; a turbine hub (output member) 7 that is fixed to an input shaft 100 of a transmission device as an automatic transmission (AT) or a continuously variable transmission (CVT), not shown, and is capable of rotating together with the input shaft 100; a multi-plate frictional lockup clutch mechanism 8; and a damper device 10 connected to the turbine hub 7 and connected to the lockup clutch mechanism 8.

The front cover 3 includes a centerpiece 30 and a cover body 33 that has a sidewall portion 34 fixed to the centerpiece 30 by welding and extending in the radial direction and an outer cylindrical portion 35 extended from the outer periphery of the sidewall portion 34 in the axial direction of the hydraulic transmission device 1. As shown in FIG. 1, a hole 30c is formed in the centerpiece 30 so that the input shaft 100 is rotatably fitted therein. A set block 36, which is coupled to a drive plate (not shown) connected to the crankshaft of the engine, not shown, is fixed to an outer peripheral portion of the sidewall portion 34 of the cover body 33 by welding etc. The pump impeller 4 has a pump shell 40 firmly fixed to the outer cylindrical portion 35 of the front cover 3, and a plurality of pump blades 41 arranged on the inner surface of the pump shell 40. The turbine runner 5 has a turbine shell 50 and a plurality of turbine blades 51 arranged on the inner surface of the turbine shell 50. The turbine shell 50 is fitted in the turbine hub 7, and is fixed to the turbine hub 7 via a rivet. The stator 6 has a plurality of stator blades 60, and the rotation direction of the stator 6 is set to only one direction by a one-way clutch 61. The pump impeller 4 and the turbine runner 5 face each other, and the pump impeller 4, the turbine runner 5, and the stator 6 form a torus (annular flow path) in which the hydraulic oil is circulated.

Figure 2:
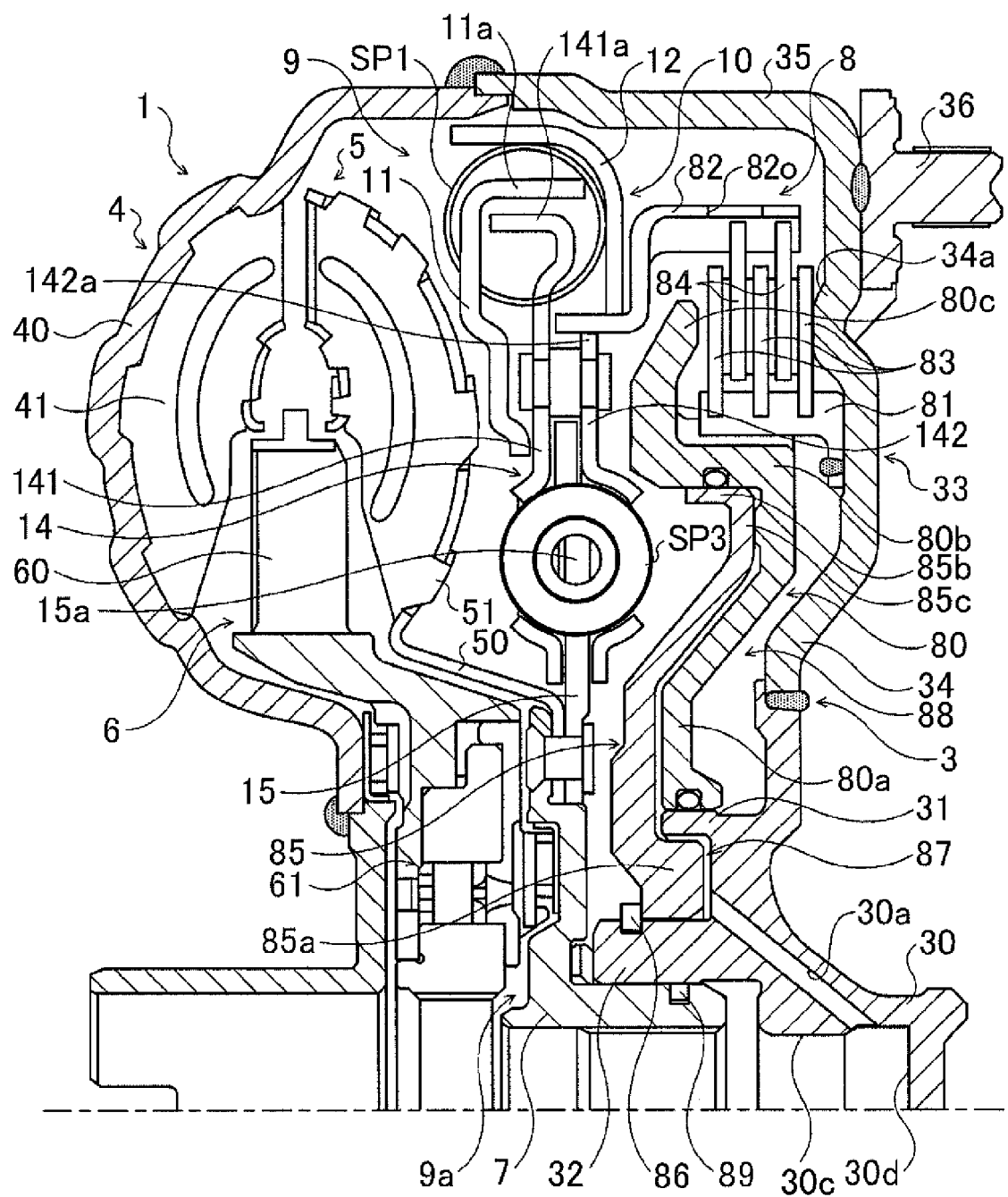
FIG. 2 is a partial sectional view showing a main part of the hydraulic transmission device 1.

As shown in FIGS. 1 and 2, the damper device 10 includes: a drive member 11 as an input element; a first intermediate member (first intermediate element) 12 that engages with the drive member 11 via a plurality of first springs (first elastic bodies) SP1; a second intermediate member (second intermediate element) 14 that engages with the first intermediate member 12 via a plurality of second springs (second elastic bodies) SP2; and a driven member (output element) 15 that engages with the second intermediate member 14 via a plurality of third springs (third elastic bodies) SP3. In the embodiment, the first and second springs SP1, SP2 are coil springs each made of a metal material wound in a helical shape so as to have a central axis extending straight when not subjected to a load. The third springs SP3 are arc springs each made of a metal material wound so as to have a central axis extending in an arc shape when not subjected to a load.

The drive member 11 has a plurality of spring contact portions 11a each contacting one end of a corresponding one of the first springs SP1, and a plurality of spring support portions 11b. The drive member 11 is fixed to a clutch drum 82 of the lockup clutch mechanism 8 via a rivet, and is placed in an outer peripheral-side region in a hydraulic transmission chamber 9 defined by the front cover 3 and the pump shell 40 of the pump impeller 4. The first intermediate member 12 is configured as an annular member that, together with the plurality of spring support portions 11b of the drive member 11, is capable of slidably supporting the first and second springs SP1, SP2 such that the first and second springs SP1, SP2 are (alternately) arranged on the same circumference so as to adjoin each other. In the embodiment, the first intermediate member 12 is rotatably supported about the axis of the hydraulic transmission device 1 by the clutch drum 82 of the lockup clutch mechanism 8, and is placed in the outer peripheral-side region in the hydraulic transmission chamber 9. As shown in FIGS. 1 and 2, the first intermediate member 12 has a plurality of pairs of spring contact portions 12a, each pair being placed between the other end of a corresponding one of the first springs SP1 and one end of the second spring SP2 adjoining this first spring SP1 and contacting both the first spring SP1 and the second spring SP2.

The second intermediate member 14 is formed by an annular first plate 141 and an annular second plate 142 that is fixed to the first plate 141 via a rivet. In the embodiment, the second intermediate member 14 is rotatably supported about the axis of the hydraulic transmission device 1 by the driven member 15. The first plate 141 of the second intermediate member 14 has on its outer peripheral side a plurality of spring contact portions 141a each contacting the other end of a corresponding one of the second springs SP2, and has on its inner peripheral side a plurality of spring support portions that support the third springs SP3. The second plate 142 of the second intermediate member 14 has on its outer peripheral side a clutch drum support portion 142a that rotatably supports the clutch drum 82 of the lockup clutch mechanism 8, and has spring support portions that face the spring support portions of the first plate 141 and support the third springs SP3, respectively. A plurality of spring contact portions (not shown) each contacting one end of a corresponding one of the third springs SP3 are formed in the first and second plates 141, 142.

Thus, each of the plurality of first springs SP1 is placed in an outer peripheral portion of the damper device 10 so as to be located between the spring contact portion 11a of the drive member 11 and the spring contact portion 12a of the first intermediate member 12, and each of the plurality of second springs SP2 is placed in the outer peripheral portion of the damper device 10 so as to be located between the spring contact portion 12a of the first intermediate member 12 and the spring contact portion 141a of the second intermediate member 14, namely the first plate 141. Each of the plurality of third springs SP3 is placed so as to be separated from the first and second springs SP1, SP2 in the radial direction of the hydraulic transmission device 1, and is located on the inner peripheral side with respect to the first and second springs SP1, SP2.

The driven member 15 is placed between the first plate 141 and the second plate 142 of the second intermediate member 14, and is fixed to the turbine hub 7. The driven member 15 has a plurality of spring contact portions 15a each contacting the other end of a corresponding one of the third springs SP3. The driven member 15 further has a plurality of plate support portions 15c protruding in the axial direction and rotatably supporting the inner periphery of the second plate 142 of the second intermediate member 14. Thus, the second intermediate member 14 is rotatably supported by the driven member 15, and is placed about the axis of the hydraulic transmission device 1.

The lockup clutch mechanism 8 is capable of performing a lockup operation of coupling the front cover 3 as the input member to the turbine hub 7, namely the input shaft 100 of the transmission device, via the damper device 10, and is capable of cancelling the lockup. As shown in FIGS. 1 and 2, the lockup clutch mechanism 8 is placed between the damper device 10 and the sidewall portion 34 of the front cover 3. The lockup clutch mechanism 8 includes: a lockup piston 80 that is supported slidably in the axial direction by the front cover 3 and rotates together with the front cover 3; an annular clutch hub (first friction plate support member) 81 that is fixed to the sidewall portion 34 of the front cover 3 (cover body 33) so as to face the lockup piston 80; the clutch drum (friction plate support member or second friction plate support member) 82 that is connected to the drive member 11 and is coupled to the input shaft 100 of the transmission device via the damper device 10; a plurality of first friction plates 83 (separator plates) that are fitted in splines formed in the outer periphery of the clutch hub 81, are supported slidably in the axial direction by the clutch hub 81, and are rotatable together with the front cover 3; a plurality of second friction plates (friction plates having a friction material) 84 that are fitted in splines formed in the inner periphery of the clutch drum 82, are supported slidably in the axial direction by the clutch drum 82, and are rotatable together with the input shaft 100; and an annular flange member (oil-chamber defining member) 85 that is fixed to the centerpiece 30 of the front cover 3 so as to be located closer to the damper device 10 than the lockup piston 80 is.

The lockup piston 80 has: an inner peripheral portion 80a that is fitted on a first cylindrical portion (first support portion) 31 formed in the centerpiece 30 and faces the inner surface of the front cover 3 (the sidewall portion 34 of the cover body 33 etc.); a cylindrical portion 80b extended from an outer peripheral portion of the inner peripheral portion 80a toward the damper device 10 and in the axial direction; and a pressing portion 80c extended outward from the cylindrical portion 80b and toward the front cover 3. The inner peripheral portion 80a of the lockup piston 80 slide-contacts the outer peripheral surface of the first cylindrical portion 31 of the centerpiece 30 via a seal member such as an O-ring. As shown in the figure, the cylindrical portion 80b of the lockup piston 80 is spline-fitted to an inner peripheral portion of the clutch hub 81 fixed to the front cover 3 (cover body 33), whereby a part of the lockup piston 80 is placed on the inner peripheral side of the clutch hub 81, and is supported slidably in the axial direction of the hydraulic transmission device 1 by the front cover 3. Moreover, the pressing portion 80c of the lockup piston 80 faces an approximately central portion (central portion between the outer and inner peripheries) of one first friction plate 83 located closest to the damper device 10 out of the plurality of first friction plates 83 supported by the clutch hub 81.

The clutch hub 81 is fixed to the inner surface of the sidewall portion 34 of the cover body 33 by welding, and as shown in the figure, the clutch hub 81 and the clutch drum 82 are placed in a region located on the outer peripheral side in the front cover 3. Moreover, the sidewall portion 34 of the cover body 33 has an annular protruding portion 34a that is formed by press molding so as to protrude in the axial direction toward the lockup piston 80, and that contacts an approximately central portion (central portion between the outer and inner peripheries) of one first friction plate 83 located closest to the front cover 3 out of the plurality of first friction plates 83 supported by the clutch hub 81. Since the protruding portion contacting one of the first and second friction plates 83, 84 is thus formed in the front cover 3 (sidewall portion 34), a so-called backing plate (end plate) can be omitted, and the number of parts can be reduced. Moreover, since a bend portion is thus formed in the front cover 3 (sidewall portion 34), rigidity of the sidewall portion 34 (front cover 3) can further be increased.

The flange member 85 has: a base portion 85a that is fitted on a second cylindrical portion (second support portion) 32 formed in the centerpiece 30 so as to protrude more toward the damper device 10 than the first cylindrical portion 31 does on the inner peripheral side of the first cylindrical portion 31; a cylindrical outer peripheral portion 85b that slide-contacts the inner peripheral surface of the cylindrical portion 80b of the lockup piston 80 via a seal member such as an O-ring to guide axial movement of the lockup piston 80; and a piston movement restricting portion 85c having an annular surface extending inward and in the radial direction (direction perpendicular to the axial direction) from the outer edge on the lockup piston 80 side of the outer peripheral portion 85b. As shown in FIG. 2, the second cylindrical portion 32 of the centerpiece 30 is formed so as to overlap the end on the damper device 10 side of the first cylindrical portion 31 as viewed in the radial direction, and the base portion 85a of the flange member 85 is inserted to the overlapping portion (recessed portion) between the first cylindrical portion 31 and the second cylindrical portion 32. Thus, the first cylindrical portion 31 and the flange member 85 fitted on the second cylindrical portion 32 overlap each other as viewed in the radial direction. The flange member 85 (base portion 85a) is fixed to the centerpiece 30 (front cover 3) in the axial direction by using a snap ring 86. As shown in the figure, the second cylindrical portion 32 of the centerpiece 30 is rotatably fitted on the turbine hub 7, and a seal member 89 such as an O-ring is placed therebetween. That is, the turbine hub 7 is rotatably fitted on the inner periphery of the second cylindrical portion 32 of the centerpiece 30.

The flange member 85 guides axial movement of the lockup piston 80, and together with the lockup piston 80 defines, on the opposite side of the lockup piston 80 from the front cover 3 (sidewall portion 34), an engagement-side oil chamber 87 to which hydraulic oil is supplied. As shown in FIG. 1, the hydraulic oil (lockup pressure) that engages the lockup clutch mechanism 8 (that brings the lockup clutch mechanism 8 into a completely engaged state or a slipping state) is supplied from a hydraulic control device (not shown), which is driven by the engine and connected to an oil pump, not shown, to the engagement-side oil chamber 87 through a first shaft oil passage 101 formed in the input shaft 100 of the transmission device and having on its one end side an opening 101a opening in the axial direction, a first engagement oil passage 91 defined between one end of the input shaft 100 fitted in the hole 30c of the centerpiece 30 and an inner end surface 30d of the centerpiece 30 (front cover 3) which faces the one end of the input shaft 100, and communicating with the opening 101a, and a second engagement oil passage 30a formed in the centerpiece 30 (front cover 3). As shown in the figure, the first shaft oil passage 101 is formed to extend along the central axis of the input shaft 100 without branching off, and has its one end (the right end in FIG. 1; the end on the inner end surface 30d side) opened so that the first shaft oil passage 101 communicates with the first engagement oil passage 91. A seal member 90 such as an O-ring is placed between the outer peripheral surface of the input shaft 100 and the inner peripheral surface of the hole 30c of the centerpiece 30. In the embodiment, as shown in FIGS. 1 and 2, the second engagement oil passage 30a formed in the centerpiece 30 opens in the axial direction to the engagement-side oil chamber 87. Moreover, the front cover 3 and the lockup piston 80 define, on the inner peripheral side of the clutch hub 81, i.e., on the inner peripheral side of the first and second frictional plates 83, 84, a first lubricant passage (oil chamber) 88 that supplies hydraulic oil into the hydraulic transmission chamber 9 defined by the front cover 3 and the pump shell 40 of the pump impeller 4, namely that supplies hydraulic oil to the first and second friction plates 83, 84, the pump impeller 4, the turbine hub 7, the damper device 10, etc. Hydraulic oil (e.g., a circulation pressure as a reduced line pressure) is supplied from the hydraulic control device, not shown, to the first lubricant passage 88 through a second shaft oil passage 102 (see FIG. 1) formed in the input shaft 100 of the transmission device, a second lubricant passage 30b (see FIG. 1) formed in the centerpiece 30, etc. Hydraulic oil is supplied to the second shaft oil passage 102 through an oil passage 104 that is defined by the inner peripheral surface of a hollow stator shaft 62 fixed (spline-fitted) to the stator blades 60, the outer peripheral surface of the input shaft 100, and a bush 94 placed between the stator shaft 62 and the input shaft 100, and through a communication hole 105 formed in the input shaft 100 and extending in the radial direction. Leakage of the hydraulic oil from the oil passage 104 toward the turbine hub 7 is prevented (suppressed) by the bush 94 located between the stator shaft 62 and the input shaft 100. This allows the hydraulic oil to be more reliably supplied from the oil passage 104 between the input shaft 100 and the stator shaft 62 to the second shaft oil passage 102 and to the first and second friction plates 83, 84. As shown in FIG. 1, the second shaft oil passage 102 is formed to extend along the central axis of the input shaft 100 without branching off, and has its one end (the right end in FIG. 1; the end on the inner end surface 30d side) closed (sealed). The outer peripheral surface of the input shaft 100, the centerpiece 30, and the turbine hub 7 define on the inner side of the second lubricant passage 30b an annular third lubricant passage 93 communicating with the second lubricant passage 30b. A communication hole 103 extending in the radial direction to allow the second shaft oil passage 102 to communicate with the third lubricant passage 93 is also formed in the input shaft 100. As can be seen from FIG. 1, the seal member 90 placed between the input shaft 100 and the centerpiece 30 (front cover 3) prevents (suppresses) communication between the first engagement oil passage 91 defined between the one end of the input shaft 100 and the inner end surface 30d and the third lubricant passage 93 defined by the outer peripheral surface of the input shaft 100, the centerpiece 30, and the turbine hub 7. Leakage of the hydraulic oil from the third lubricant passage 93 toward the damper device 10 is prevented (suppressed) by the seal member 89 placed between the turbine hub 7 and the second cylindrical portion 32 of the centerpiece 30 (front cover 3), and leakage of the hydraulic oil from the third lubricant passage 93 toward the bush 94 is prevented (suppressed) by a fit seal portion 95 formed by the inner peripheral surface of the turbine hub 7 and the outer peripheral surface of the input shaft 100. As shown in FIG. 1, an opening 81o that allows the first lubricant passage 88 to communicate with the first and second friction plate 83, 84 side, namely the hydraulic transmission chamber 9, is formed in the clutch hub 81, and an opening 82o that allows the first lubricant passage 88 side to communicate with the hydraulic transmission chamber 9 is formed in the clutch drum 82.

Operation of the hydraulic transmission device 1 as a starting device configured as described above will be described below. In a vehicle having the hydraulic transmission device 1 mounted thereon, the lockup clutch mechanism 8 is disengaged before starting. When the engine is started and is in an idle state, the hydraulic transmission device 1 is in a stall state where the pump impeller 4 connected to the front cover 3 rotates at the same rotational speed as the engine and the turbine runner 5 does not rotate and stops. Hydraulic oil from the hydraulic control device, not shown, is supplied into the hydraulic transmission chamber 9 of the hydraulic transmission device 1 through the second shaft oil passage 102 and the communication hole 103 of the input shaft 100, the third lubricant passage 93 defined by the outer peripheral surface of the input shaft 100, the centerpiece 30, and the turbine hub 7, the second lubricant passage 30b of the centerpiece 30, and the first lubricant passage 88. As the rotational speed and the output torque of the engine increases from the stall state, power from the engine is transmitted to the pump impeller 4 via the front cover 3, and the turbine runner 5 is rotated by the flow of the hydraulic oil according to the rotation of the pump impeller 4. Thus, the power from the engine is transmitted to the transmission device of a subsequent stage via the pump impeller 4, the turbine runner 5, and the turbine hub 7. When the rotational speed difference between the pump impeller 4 and the turbine runner 5 is large, the hydraulic transmission device 1 functions as a torque amplifier by the operation of the stator 6. When this rotational speed difference is small, the hydraulic transmission device 1 functions as a fluid coupling. The hydraulic oil supplied into the hydraulic transmission chamber 9 flows in the hydraulic transmission chamber 9, and then is returned to an oil pan, not shown, through an oil passage 9a etc.

If the rotational speed of the engine or the input shaft 100 of the transmission device reaches a predetermined relatively low clutch engagement rotational speed, slip control is performed in which hydraulic oil is supplied to the engagement-side oil chamber 87 and the lockup pressure to the engagement-side oil chamber 87 is gradually made higher than the circulation pressure to the first lubricant passage 88 so that the torque capacity of the lockup clutch mechanism 8 is gradually increased. Thus, the lockup piston 80 is moved in the axial direction toward the sidewall portion 34 of the front cover 3 to press the first and second friction plates 83, 84 against the protruding portion 34a of the sidewall portion 34, whereby the power from the engine is transmitted to the transmission device in the subsequent stage also via a transmission path formed by the front cover 3, the lockup clutch mechanism 8, the damper device 10, and the turbine hub 7. At this time, the lockup clutch mechanism 8 transmits the power from the front cover 3 to the turbine hub 7 while causing slipping between the front cover 3 and the turbine hub 7, and vibrations in torque (torsional vibrations) are absorbed (dampened) by the damper device 10 coupled to the front cover 3 via the clutch hub 81.

Performing such slip control can suppress revving up of the engine to improve fuel economy of the engine, and can transmit power from the engine to the transmission device. Moreover, since the lockup clutch mechanism 8 of the embodiment is a multi-plate friction clutch, the torque capacity at which the slip control is performed can be set more properly. In this case, since a sufficient amount of hydraulic oil can be supplied to the first and second friction plates 83, 84 of the lockup clutch mechanism 8 through the first lubricant passage 88, the first and second friction plates 83, 84, the damper device 10, various bearings, etc. can be satisfactorily lubricated and cooled. That is, the second shaft oil passage 102 and the communication hole 103 are formed in the input shaft 100, and the second shaft oil passage 102 communicates with the first lubricant passage 88 through the second lubricant passage 30b formed in the centerpiece 30 of the front cover 3. Thus, no oil passage branching from the second shaft oil passage 102 is required, and the amount of leakage of the hydraulic oil in the second shaft oil passage 102 can be reduced to substantially zero. The first lubricant passage 88 having a sufficient capacity can be defined on the inner peripheral side of the first and second friction plates 83, 84 by the front cover 3 and the lockup piston 80 by configuring the lockup clutch mechanism 8 so that the lockup clutch mechanism 8 is engaged when the lockup piston 80 is moved in the axial direction toward the front cover 3, and defining the engagement-side oil chamber 87 on the opposite side of the lockup piston 80 from the front cover 3 by using the flange member 85. Accordingly, in the hydraulic transmission device 1, a sufficient amount of hydraulic oil can be supplied to the first and second friction plates 83, 84 of the lockup clutch mechanism 8, and the first and second friction plates 83, 84 can be efficiently lubricated and cooled. Moreover, in the lockup clutch mechanism 8 of the embodiment, the pressing portion 80c of the lockup piston 80 contacts the approximately central portion of the first friction plate 83 located closest to the damper device 10, and the protruding portion 34a formed in the sidewall portion 34 of the cover body 33 contacts the approximately central portion of the first friction plate 83 located closest to the front cover 3. This can suppress inclination of the first and second friction plates 83, 84 and can satisfactorily suppress uneven wear and heat generation.

Moreover, if predetermined lockup conditions are satisfied with, e.g., a vehicle speed and an accelerator opening amount (accelerator operation amount) as parameters, the lockup pressure is set so that the lockup clutch mechanism 8 is fully engaged, and the lockup piston 80 is moved further in the axial direction toward the sidewall portion 34 of the front cover 3 to press the first and second friction plates 83, 84 together, whereby the front cover 3 and the turbine hub 7 (input shaft 100) are coupled (locked up) by the lockup clutch mechanism 8 via the damper device 10. This allows the power from the engine to be directly and efficiently transmitted to the transmission device in the subsequent stage without via the pump impeller 4 and the turbine runner 5. Even after the lockup is thus completed, variations in torque that is applied to the front cover 3 are absorbed by the damper device 10.

On the other hand, when the lockup performed by the lockup clutch mechanism 8 is canceled, supply of the hydraulic oil (circulation pressure) to the first lubricant passage 88 is continued, and the lockup pressure to the engagement-side oil chamber 87 is gradually reduced to stop supply of the hydraulic oil. Thus, the lockup piston 80 is moved in the axial direction away from the front cover 3 (toward the damper device 10), and is stopped when the back surface of the lockup piston 80 contacts the piston movement restricting portion 85c of the flange member 85. At this time, since a sufficient amount of hydraulic oil is supplied to the first and second friction plates 83, 84 through the second shaft oil passage 102, the communication hole 103, the third lubricant passage 93, the second lubricant passage 30b, and the first lubricant passage 88, the first and second friction plates 83, 84 that have been pressed together can be quickly separated from each other in the lockup clutch mechanism 8 of the embodiment.

In the hydraulic transmission device 1, the first engagement oil passage 91 communicating with the first shaft oil passage 101 formed in the input shaft 100 is defined between the one end of the input shaft 100 and the inner end surface 30d of the centerpiece 30 facing the one end of the input shaft 100, and the second engagement oil passage 30a communicating with the first engagement oil passage 91 and the engagement-side oil chamber 87 is formed in the centerpiece 30. The hydraulic oil is supplied from the first shaft oil passage 101 of the input shaft 100 through the first engagement oil passage 91 and the second engagement oil passage 30a to the engagement-side oil chamber 87 between the lockup piston 80 and the flange member 85. Accordingly, in the hydraulic transmission device 1, the amount of leakage of the hydraulic oil in the first shaft oil passage 101, the first engagement oil passage 91, and the second engagement oil passage 30a can be reduced as much as possible by merely placing between the input shaft 100 and the centerpiece 30 one seal member 90 that suppresses leakage of the hydraulic oil from the first engagement oil passage 91.

Moreover, the hydraulic transmission device 1 includes the turbine hub 7 that can be coupled to the front cover 7 via the lockup clutch mechanism 8, and that is rotatably fitted in the centerpiece 30 and is rotatable together with the input shaft 100. The input shaft 100, the centerpiece 30, and the turbine hub 7 define the third lubricant passage 93 communicating with the second shaft oil passage 102 of the input shaft 100 and the second lubricant passage 30b. One seal member 90 is placed between the centerpiece 30 and the input shaft 100 and one seal member 89 is placed between the centerpiece 30 and the turbine hub 7 so as to suppress leakage of the hydraulic oil from the third lubricant passage 93. Thus, the seal member 90 between the centerpiece 30 and the input shaft 100 can suppress leakage of the hydraulic oil from the first engagement oil passage 91 and suppress communication between the first engagement oil passage 91 and the third lubricant passage 93, and the seal member 89 between the centerpiece 30 and the turbine hub 7 can suppress leakage of the hydraulic oil from the third lubricant passage 93 toward the damper device 10. As a result, the number of seal members can be reduced in the hydraulic transmission device 1.

As described above, the lockup clutch mechanism 8 included in the hydraulic transmission device 1 of the embodiment includes: the lockup piston 80 that is capable of moving in the axial direction toward the front cover 3 to press the first and second friction plates 83, 84; and the flange member 85 that together with the lockup piston 80 defines, on the opposite side of the lockup piston 80 from the front cover 3, the engagement-side oil chamber 87 to which the hydraulic oil is supplied. The front cover 3 and the lockup piston 80 define on the inner peripheral side of the first and second friction plates 83, 84 the first lubricant passage 88 that supplies hydraulic oil to the first and second friction plates 83, 84.

Thus, the first lubricant passage 88 having a sufficient capacity can be defined on the inner peripheral side of the first and second friction plates 83, 84 by the front cover 3 and the lockup piston 80 by configuring the lockup clutch mechanism 8 so that the lockup clutch mechanism 8 is engaged when the lockup piston 80 is moved in the axial direction toward the front cover 3, and defining the engagement-side oil chamber 87 on the opposite side of the lockup piston 80 from the front cover 3 by using the flange member 85. Accordingly, a sufficient amount of hydraulic oil can be supplied to the first and second friction plates 83, 84 through the first lubricant passage 88, and the first and second friction plates 83, 84 can be efficiently cooled. If a sufficient amount of hydraulic oil is supplied to the first and second friction plates 83, 84 through the first lubricant passage 88 when the lockup clutch mechanism 8 is disengaged, the first and second friction plates 83, 84 that have been pressed together can be quickly separated from each other. Accordingly, a return spring can be omitted, and the axial length of the lockup clutch mechanism 8 can be reduced.

Moreover, since the engagement-side oil chamber 87 is defined on the opposite side of the lockup piston 80 from the front cover 3 by using the flange member 85, a relatively high lockup pressure that engages the lockup clutch mechanism 8 is not applied to the front cover 3, and bulging of the front cover 3 can be suppressed. In the embodiment, the protruding portion 34a protruding in the axial direction toward the lockup piston 80 and contacting one of the first and second friction plates 83, 84 (in the embodiment, the first friction plate 83 located closest to the front cover 3) is formed in the sidewall portion 34 of the front cover 3. This can reduce the number of parts and can further increase rigidity of the front cover 3.

In the case where the flange member 85 is fitted in the front cover 3 and is fixed to the front cover 3 in the axial direction by using, e.g., the snap ring 86 as in the embodiment, the engagement-side oil chamber 87 can be satisfactorily sealed by providing a seal member between the inner peripheral surface of the cylindrical portion 80b of the lockup piston 80 and the cylindrical outer peripheral portion 85b that slide-contacts the inner peripheral surface of the cylindrical portion 80b of the lockup piston 80 and between the second cylindrical portion 32 of the centerpiece 30 and the turbine hub 7. This can reduce the number of seal members that are used to seal the engagement-side oil chamber 87.

In the hydraulic transmission device 1 of the embodiment, when torque by the pump impeller 4 and the turbine runner 5 is transferred, a sufficient amount of hydraulic oil can be supplied to the hydraulic transmission chamber 9, i.e., the pump impeller 4 and the turbine runner 5, through the first lubricant passage 88. When the lockup clutch mechanism 8 is engaged (during slip control or lockup), a sufficient amount of hydraulic oil can be supplied to the first and second friction plates 83, 84 through the first lubricant passage 88, and the first and second friction plates 83, 84 can be efficiently cooled.

Figure 3:
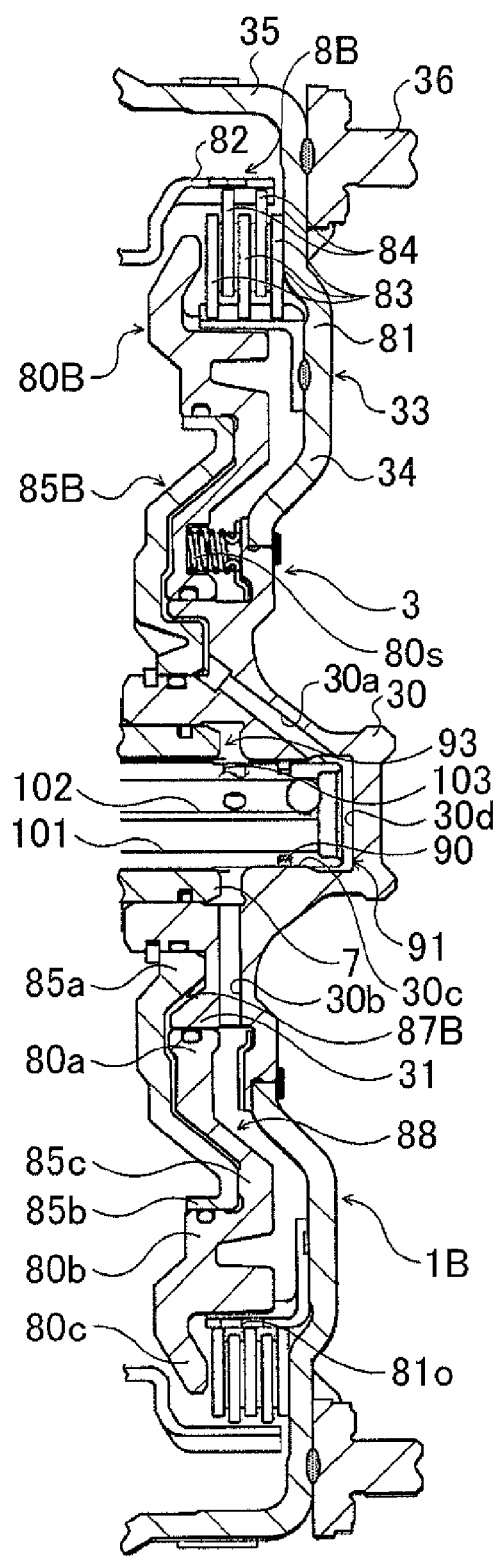
FIG. 3 is an enlarged partial sectional view showing a main part of a hydraulic transmission device 1B according to a modification.

As in a hydraulic transmission device 1B shown in FIG. 3, the inner diameter of a cylindrical portion 80b of a lockup piston 80B may be reduced (by locating the inner peripheral surface of the cylindrical portion 80b at a position closer to the device central axis) to reduce the capacity of an engagement-side oil chamber 87B defined by the lockup piston 80B and a flange member 85B. This can improve response of a lockup clutch mechanism 813 to the lockup pressure. In this case, as shown in FIG. 3, a return spring 80s may be placed between the lockup piston 80B and the front cover 3. A damper device 10 may be configured so that a driven member is placed on the outer peripheral side in a hydraulic transmission chamber defined by a front cover and a pump shell of a pump impeller, and that a drive member is placed on the inner peripheral side in the hydraulic transmission chamber. The damper device 10 may be configured as a so-called parallel damper device. Moreover, the damper device 10 described above may be applied to a fluid coupling that does not include any stator that adjusts the flow of working fluid from a turbine runner toward the pump impeller.

Correspondence between the primary elements of the embodiment and the primary elements of the invention described in "SUMMARY OF THE INVENTION" will be described below. In the embodiment, the hydraulic transmission device 1 including the lockup clutch mechanism 8 that performs a lockup operation of directly transferring torque input to the front cover 3 as an input member to the input shaft 100 of the transmission device and cancels the lockup corresponds to the "starting device." The first friction plate 83 that is rotatable together with the front cover 3 corresponds to the "first friction plate," and the second friction plate 84 that is rotatable together with the input shaft 100 of the transmission device corresponds to the "second friction plate." The lockup piston 80 capable of rotating together with the front cover 3 and moving in the axial direction toward the front cover 3 to press the first and second friction plates 83, 84 corresponds to the "piston." The flange member 85 that together with the lockup piston 80 defines the engagement-side oil chamber 87 to which hydraulic oil is supplied corresponds to the "oil-chamber defining member." The first lubricant passage 88 that is defined by the front cover 3 and the lockup piston 80 to supply hydraulic oil to the first and second friction plates 83, 84 corresponds to the "first lubricant passage." The second lubricant passage 30b that is formed in the centerpiece 30 of the front cover 3 to communicate with the first lubricant passage 88 corresponds to the "second lubricant passage." The first shaft oil passage 101 that is formed in the input shaft 100 to communicate with the engagement-side oil chamber 87 corresponds to the "first shaft oil passage." The second shaft oil passage 102 that is formed in the input shaft 100 to communicate with the second lubricant passage 30b corresponds to the "second shaft oil passage." The first engagement oil passage 91 that is defined between the one end of the input shaft 100 and the inner end surface 30d of the centerpiece 30 to communicate with the first shaft oil passage 101 corresponds to the "first engagement oil passage," and the second engagement oil passage 30a that is formed in the centerpiece 30 to communicate with the first engagement oil passage 91 and the engagement-side oil chamber 87 corresponds to the "second engagement oil passage." The turbine hub 7 that can be coupled to the front cover 3 via the lockup clutch mechanism 8 and that is rotatably fitted on the centerpiece 30 and is rotatable together with the input shaft 100 corresponds to the "output member." The third lubricant passage 93 that is defined by the input shaft 100, the centerpiece 30, and the turbine hub 7 to communicate with the second shaft oil passage 102 and the second lubricant passage 30b corresponds to the "third lubricant passage." The seal member 90 placed between the centerpiece 30 and the input shaft 100 and the seal member 89 placed between the centerpiece 30 and the turbine hub 7 correspond to the "seal member." The protruding portion 34a that is formed in the sidewall portion 34 of the cover body 33 of the front cover 3 so as to protrude in the axial direction toward the lockup piston 80 and to contact the first friction plate 83 corresponds to the "protruding portion." The correspondence between the primary elements of the embodiment and the primary elements of the invention described in "SUMMARY OF THE INVENTION" is shown by way of example to specifically describe the mode in which the embodiment carries out the invention described in "SUMMARY OF THE INVENTION." Thus, this correspondence is not intended to limit the elements of the invention described in "SUMMARY OF THE INVENTION." That is, the embodiment is merely a specific example of the invention described in "SUMMARY OF THE INVENTION," and the invention described in "SUMMARY OF THE INVENTION" should be construed based on the description therein.

Although the mode for carrying out the invention is described above based on the embodiment, it should be understood that the present invention is not limited in any way to the above embodiment, and various modifications can be made without departing from the spirit and scope of the present invention.

The present invention can be used in the field of manufacturing starting devices, etc.

What is claimed is:

1. A starting device comprising:
a clutch configured to transmit power input from an input member to an input shaft of a transmission device and configured to cut off the power transmission between the input member and the input shaft, wherein the clutch includes
a first friction plate arranged to rotate together with the input member,
a second friction plate arranged to rotate together with the input shaft of the transmission device,
a piston rigidly fixed to the input member so as to rotate together with the input member and move in an axial direction toward the input member to press the first and second friction plates, and
an oil-chamber defining member rigidly fixed to the input member so as to rotate together with the input member, the oil-chamber defining member and the piston together defining an engagement-side oil chamber to which hydraulic oil is supplied, wherein
a first lubricant passage arranged to supply the hydraulic oil to the first and second friction plates is defined between the input member and the piston,
a second lubricant passage communicating with the first lubricant passage is formed in the input member, and
a first shaft oil passage communicating with the engagement-side oil chamber and a second shaft oil passage communicating with the second lubricant passage are formed in the input shaft.

2. The starting device according to claim 1, wherein
a first engagement oil passage communicating with the first shaft oil passage is defined between one end of the input shaft and an inner end surface of the input member which faces the one end of the input shaft, and
a second engagement oil passage communicating with the first engagement oil passage and the engagement-side oil chamber is formed in the input member.

3. The starting device according to claim 2, further comprising:
an output member that can be coupled to the input member via the clutch, and that is rotatably fitted in the input member and is rotatable together with the input shaft, wherein
the input shaft, the input member, and the output member define a third lubricant passage communicating with the second shaft oil passage and the second lubricant passage, and
a seal member is placed between the input member and the input shaft and a seal member is placed between the input member and the output member in order to suppress leakage of the hydraulic oil from the third lubricant passage.

4. The starting device according to claim 3, wherein
the hydraulic oil is supplied to the second shaft oil passage through an oil passage that is defined by the input shaft, a stator shaft placed around an outer periphery of the input shaft, and a bush placed between the input shaft and the stator shaft to suppress leakage of the hydraulic oil, and
the input shaft and the output member form a fit seal portion that suppresses leakage of the hydraulic oil from the third lubricant passage.

5. The starting device according to claim 1, wherein
the input member has a protruding portion that is formed so as to protrude in the axial direction toward the piston, and that contacts one of the first and second friction plates.

6. The starting device according to claim 1, wherein
the oil chamber defining member is fitted in the input member and is fixed to the input member in the axial direction.

7. The starting device according to claim 1, further comprising:
a pump impeller; and
a turbine runner, wherein
the input member is a front cover that is bonded to a pump shell of the pump impeller, and that together with the pump shell fauns a hydraulic transmission chamber, and
the hydraulic oil is supplied to the hydraulic transmission chamber through the first lubricant passage.

8. The starting device according to claim 1, further comprising:
a clutch hub that is fixed to an inner surface of a side wall portion of the input member and supports the first friction plate.

9. The starting device according to claim 1, further comprising:
a damper device that transmits power, which is transmitted from the first friction plate to the second friction plate by engaging the clutch, to the input shaft of the transmission device.

10. The starting device according to claim 1, wherein
the clutch further comprises a return spring that is placed between the input member and the piston.

11. A starting device comprising:
a clutch configured to transmit power input from an input member to an input shaft of a transmission device and configured to cut off the power transmission between the input member and the input shaft, wherein the clutch includes
a first friction plate arranged to rotate together with the input member,
a second friction plate arranged to rotate together with the input shaft of the transmission device,
a piston arranged to rotate together with the input member and move in an axial direction toward the input member to press the first and second friction plates, and
an oil-chamber defining member arranged to rotate together with the input member, the oil-chamber defining member and the piston together defining an engagement-side oil chamber to which hydraulic oil is supplied, wherein
a first lubricant passage arranged to supply the hydraulic oil to the first and second friction plates is defined between the input member and the piston,
a second lubricant passage communicating with the first lubricant passage is formed in the input member,
a first shaft oil passage communicating with the engagement-side oil chamber and a second shaft oil passage communicating with the second lubricant passage are formed in the input shaft, and
the piston has at least first and second positions at distinct locations along the axial direction, the piston is arranged spaced from the first and second friction plates in the first position, the piston is arranged to contact one of the first and second friction plates in the second position, and the piston and the oil-chamber defining member both rotate together with the input member when the piston is in the first position.

* * * * *